United States Patent [19]
Alfors

[11] Patent Number: 5,457,384
[45] Date of Patent: Oct. 10, 1995

[54] APPARATUS AND METHOD FOR ATTACHING A SENSOR TO AN OBJECT

[75] Inventor: Eugene D. Alfors, Rockford, Ill.

[73] Assignee: Honeywell Inc., Minneapolis, Minn.

[21] Appl. No.: 232,564

[22] Filed: Apr. 25, 1994

[51] Int. Cl.$^6$ .............................. G01B 7/14; G01P 3/42; F16B 21/20
[52] U.S. Cl. .................... 324/262; 123/617; 324/207.25; 403/256; 403/326
[58] Field of Search .......................... 29/520; 324/207.12, 324/207.25, 262; 123/612, 616, 617; 403/256, 326

[56] References Cited

U.S. PATENT DOCUMENTS

| | | | |
|---|---|---|---|
| 721,559 | 2/1903 | Goodridge | 29/520 |
| 1,460,749 | 7/1923 | Dull | 29/520 |
| 2,209,181 | 7/1940 | Wendel | 29/520 X |
| 3,038,456 | 6/1962 | Dreisin | 29/520 X |
| 3,425,119 | 2/1969 | Holtfreter | 29/520 X |
| 4,187,597 | 2/1980 | Bremer, Jr. | 29/520 X |
| 4,612,501 | 9/1986 | Costello et al. | |
| 4,677,378 | 6/1987 | Tokura et al. | |
| 4,914,389 | 4/1990 | Juds | 324/207.25 X |
| 5,087,879 | 2/1992 | Sugifune et al. | 324/207.12 X |
| 5,121,289 | 6/1992 | Gagliardi | |
| 5,140,262 | 8/1992 | Stolfus | |

Primary Examiner—Joseph M. Gorski
Attorney, Agent, or Firm—William D. Lanyi

[57] ABSTRACT

An apparatus and method is provided for attaching a gear tooth sensor to an object, such as an engine block of an automobile. A clamping bar and a deformable conical washer are associated with a tubular portion of the sensor in such a way that rigid attachment of the clamping bar to the engine block, such as through the use of a threaded bolt, deforms the conical washer into a generally flat shape and, in the process, causes a distal end of the tubular portion of the sensor to move away from a target by a predetermined distance. Prior to deforming the deformable washer between the clamping bar and the engine block, the sensor is moved into contact with a rotatable target, such as a gear. The distal end of the in contact with the target, the clamping bar is used to compress and deform the washer so that the deformation of the washer causes the distal end of the tubular portion to move away from the target by a predetermined amount that results in an accurately set gap between a magnetically sensitive component within the sensor and the teeth of the rotatable target.

13 Claims, 6 Drawing Sheets

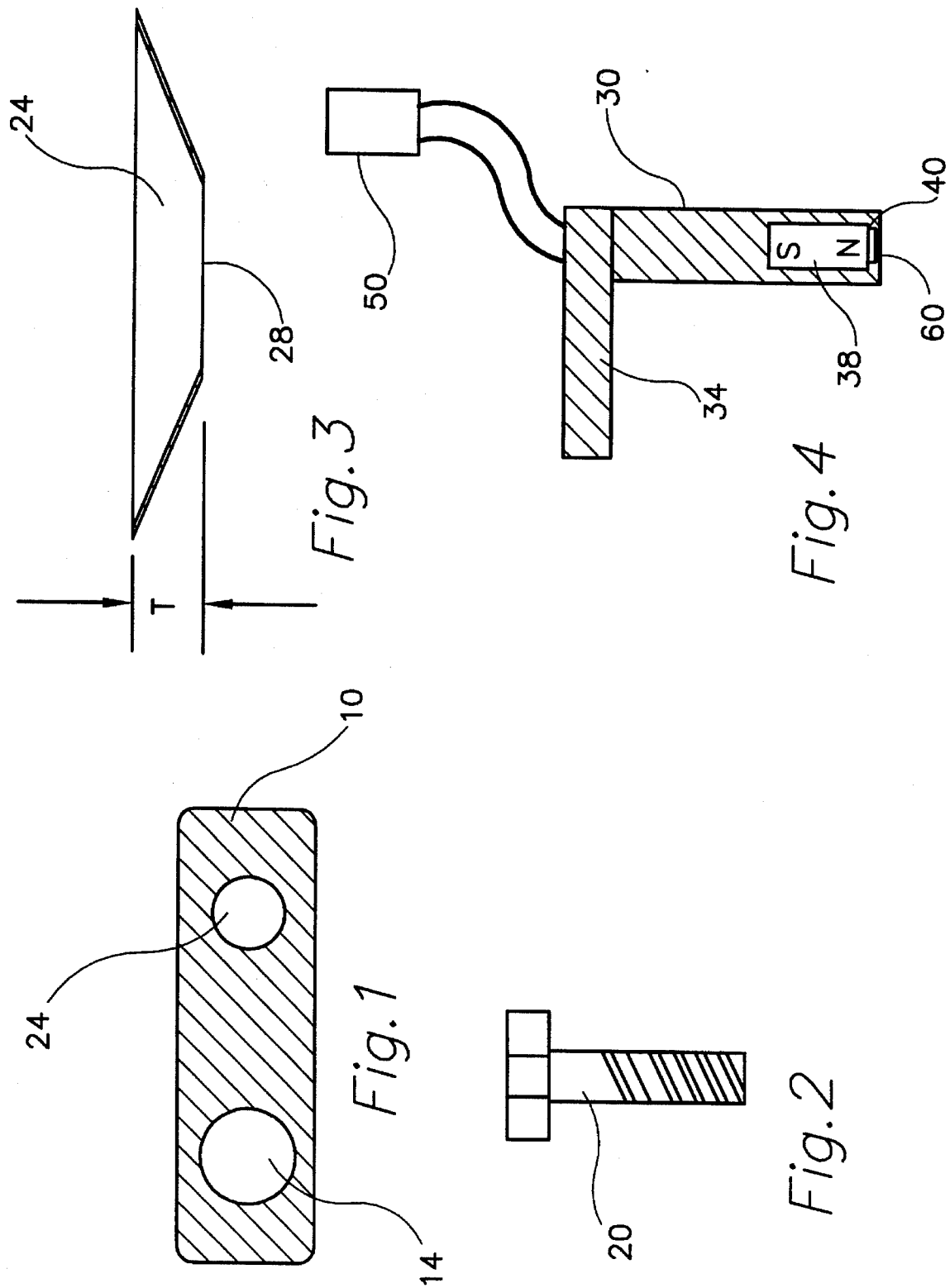

APPARATUS AND METHOD FOR ATTACHING A SENSOR TO AN OBJECT

BACKGROUND OF THE INVENTION

1. Field of the Invention

The present invention is generally related to position sensors and, more specifically, to a method and apparatus for attaching a gear tooth sensor to an automobile engine in such a way that the distal end of the sensor is positioned at a precise location relative to a rotatable target.

2. Description of the Prior Art

Many different types of sensors are known to those skilled in the art and many varieties of gear tooth sensors are also well known. In operation, a gear tooth sensor, or proximity sensor, typically comprises a permanent magnet in association with a magnetically sensitive component such as a Hall effect element or a magnetoresistive element. Sensors of this type are constructed in such a way that a ferromagnetic component passing through a predefined detection zone will cause the magnetically sensitive component to provide a signal identifying this event. The ferromagnetic object can be the teeth of a gear, whether or not the gear is intended to operate in the traditional manner of a gear or merely to provide a plurality of teeth extending from a rotatable target, in order to facilitate the detection of the teeth for the purpose of sensing the angular position or velocity of the rotating target. Devices of this type find many applications in automobiles, including sensors which monitor the position of crank shafts and cam shafts and, in addition, sensors which are used in automatic braking systems. A problem which occurs when sensors of this type are installed relative to a rotatable target is that the gap between the distal end, or operative end, of the sensor and the target must be maintained with a relatively high degree of accuracy. Otherwise, the signal level provided by the magnetically sensitive component of the sensor will not be properly calibrated to the angular position of the target.

U.S. Pat. No. 4,677,378, which issued to Tokura et al on Jun. 30, 1987, discloses a displacement sensor which has a magnetically responsive member and a pair of piezoelectric elements. The sensor is provided with first and second piezoelectric elements, a pair of electrodes at one and the other ends of each of the first and second piezoelectric elements and a permanent magnet mechanically fixed to one end of the first piezoelectric element. In addition, it provides a small piece which is mechanically fixed to one end of the second piezoelectric element and has approximately the same weight as the permanent magnet. A base plate to which the other ends of the first and second piezoelectric elements are mechanically fixed is provided wherein the electrodes provided at the other end of each of the first and second piezoelectric elements are electrically connected. The electrodes provided at one end of each of the first and second piezoelectric elements are used as output terminals. In addition, a pair of small pieces made of a magnetic material and a nonmagnetic material can be used instead of the permanent magnet and small piece.

U.S. Pat. No. 5,121,289, which issued to Gagliardi on Jun. 9, 1992, describes an encapsulatable sensor assembly. The description in the Gagliardi patent shows the inner construction of a gear tooth sensor which comprises a permanent magnet and a magnetically sensitive component. The assembly includes an external housing with internal support components for retaining an active sensor element and associated electrical circuitry in a predetermined relationship while providing a plurality of internal sequentially interconnected cavities for facilitating a flow of an encapsulating material from an injection port to a vented overflow in order to assure a complete fill of the internal cavities to restrain the internal components. The sensor assembly provides a structure for a void free encapsulation and internal leadwire stress relief concurrently with location control of the internal component while also providing a combination which is easily adaptable to automatic assembly and encapsulation techniques.

U.S. Pat. No. 5,140,262, which issued to Stolfus on Aug. 18, 1992, discloses a gear tooth sensor with a centerline in nonintersecting relation with a center of rotation of a rotatable member. The off-axis gear tooth sensor is provided with a centerline of the sensor that is disposed along a line which is not coincident with the center of rotation of the rotatable member to be sensed. Instead, the centerline of the housing in which a Hall effect element is disposed is positioned at a perpendicular distance from the center of rotation of the rotatable member which is determine as the function of range of dimensions which define the allowable gap between the Hall effect element and a surface of the rotatable member. The perpendicular distance between the center of rotation and the line along which the proximity sensor is disposed is mathematically determined as a function of the distances between the center of rotation of the rotatable member and the minimum and maximum possible locations of the Hall effect element along with the angular distance between those two dimensions. The sensor provides a gear tooth sensor which is significantly immune to changes in the gap between a Hall effect element and the surface of a rotatable member which is being sensed. The rotatable member is provided with at least one discontinuity in its surface which causes changes in the magnetic field surrounding a Hall effect element and, as a result, provides a signal from the Hall effect element to indicate the proximity of the discontinuity to the Hall effect element.

The Tokura et al patent shows the relative position of a gear tooth sensor to the rotatable target comprising a plurality of gear teeth. The Gagliardi patent shows the internal structure of a gear tooth sensor with a permanent magnet and a magnetically sensitive component disposed internally and proximate a distal end of the sensor. The Stolfus patent shows one particular technique that has been used in order to reduce the sensitivity of a gear tooth sensor to variations in the position of the distal end of the sensor relative to a rotatable target. Accuracy in the position of the sensor relative to the target is very important to the proper operation of the sensor.

It would therefore be significantly beneficial to the field of gear tooth sensing if a means could be provided which allows the gap between a distal end of a gear tooth sensor and a rotatable target to be accurately set without the need of expensive and time consuming techniques and without the need for complex measurements and procedures.

SUMMARY OF THE INVENTION

The present invention provides an apparatus and method for installing a gear tooth sensor in an automobile engine without the need for complex measurements and procedures. In addition, the present invention permits the distal end of the gear tooth sensor to be accurately located at a predefined distance from the rotatable target without the need for time consuming and expensive processes. The apparatus of the present invention comprises a sensor which has a generally tubular portion. In addition, a deformable washer is shaped to be slideably disposable over the tubular portion of the sensor. A clamping bar is provided with an opening therethrough that is shaped to slideably receive the tubular portion of the sensor therein. A third opening is formed through the bar. A threaded bolt is shaped to slide through the third opening of the clamping bar. The bolt is engagable in threaded association with a hole in the object, such as an automobile engine block. The deformable washer is compressible between the clamping bar and the object and is thereby deformed in such a way that it compresses the edges of its opening into rigid attachment with the tubular portion of the sensor when the bolt is tightened to compress the clamping bar against the object. The tubular portion of the sensor is axially moved from a first position to a second position as a result of the washer being deformed between the clamping bar and the object.

In a particularly preferred embodiment of the present invention, the sensor is a magnetically sensitive device and the object is an automobile engine block. Also in a preferred embodiment of the present invention, the washer is in the shape of a frustum of a cone, such as a Belleville washer. The tubular portion of the sensor can have a generally circular cross section or a noncircular cross section, depending on the particular design and application of the sensor. When the sensor is initially installed relative to the object, the distal end of the tubular portion of the sensor is placed in contact with a rotatable object to be sensed when in the first position described above and the distal end is spaced apart from the rotatable object to be sensed by a predetermined gap when in the second position described above. In one embodiment of the present invention, the deformable washer and the tubular portion of the sensor are shaped to result in a slight deformation of the tubular portion when the washer is deformed by being compressed between the bar and the object.

In order to perform the method of the present invention, a preferred embodiment provides a sensor which has a tubular portion and disposes the tubular portion through an opening formed through a clamping bar. In addition, the method of the present invention disposes the tubular portion through an opening formed through a deformable washer and inserts the tubular portion into an opening of the object until a distal end of the tubular portion touches the target. The present invention then forces the clamping bar toward the object in order to deform the washer between the object and the clamping bar, wherein the washer is deformed to cause the distal end of the tubular portion to move away from the target by a predetermined distance. In a preferred embodiment of the present invention, the compressing step comprises the step of inserting a bolt through the clamping bar and into the object and then tightening the bolt into the object.

The present invention provides an apparatus and method which allows a sensor to be inserted into an engine block of an automobile until it touches the target with its distal end. As the sensor is inserted into the engine block, the deformable washer is forced along the tubular portion of the sensor as the washer is disposed in contact with a portion of the engine block and the tubular portion is pushed through the deformable washer into the engine block. With the distal end of the tubular portion in contact with the rotatable target, the clamping bar is tightened through the use of bolt until it moves toward the engine block and compresses the deformable washer. When the deformable washer is compressed, it assumes a generally flat shape. During the deformation, the inner circular edge around the opening of the washer compresses into the tubular portion of the sensor and becomes rigidly attached to it. As the deformation of the washer continues, the inner edge of the washer is caused to move away from the target and, because of the attachment between the washer and the sensor, the sensor is pulled away from the target by a preselected distance. When the washer assumes its final flat shape, the distal end of the sensor is a predefined and accurately determined distance from the rotatable target and the appropriate gap between the magnetically sensitive component and the teeth of the target is set.

BRIEF DESCRIPTION OF THE DRAWINGS

The present invention will be more fully understood from a reading of the Description of the Preferred Embodiment in conjunction with the drawings, in which:

FIG. 1 shows a clamping bar used in association with the present invention;

FIG. 2 shows a bolt that is usable in conjunction with the clamping bar of FIG. 1;

FIG. 3 shows a deformable washer that used in a preferred embodiment of the present invention;

FIG. 4 shows a sensor such as that generally known in the art as a gear tooth sensor;

DESCRIPTION OF THE PREFERRED EMBODIMENT

Figure 5:
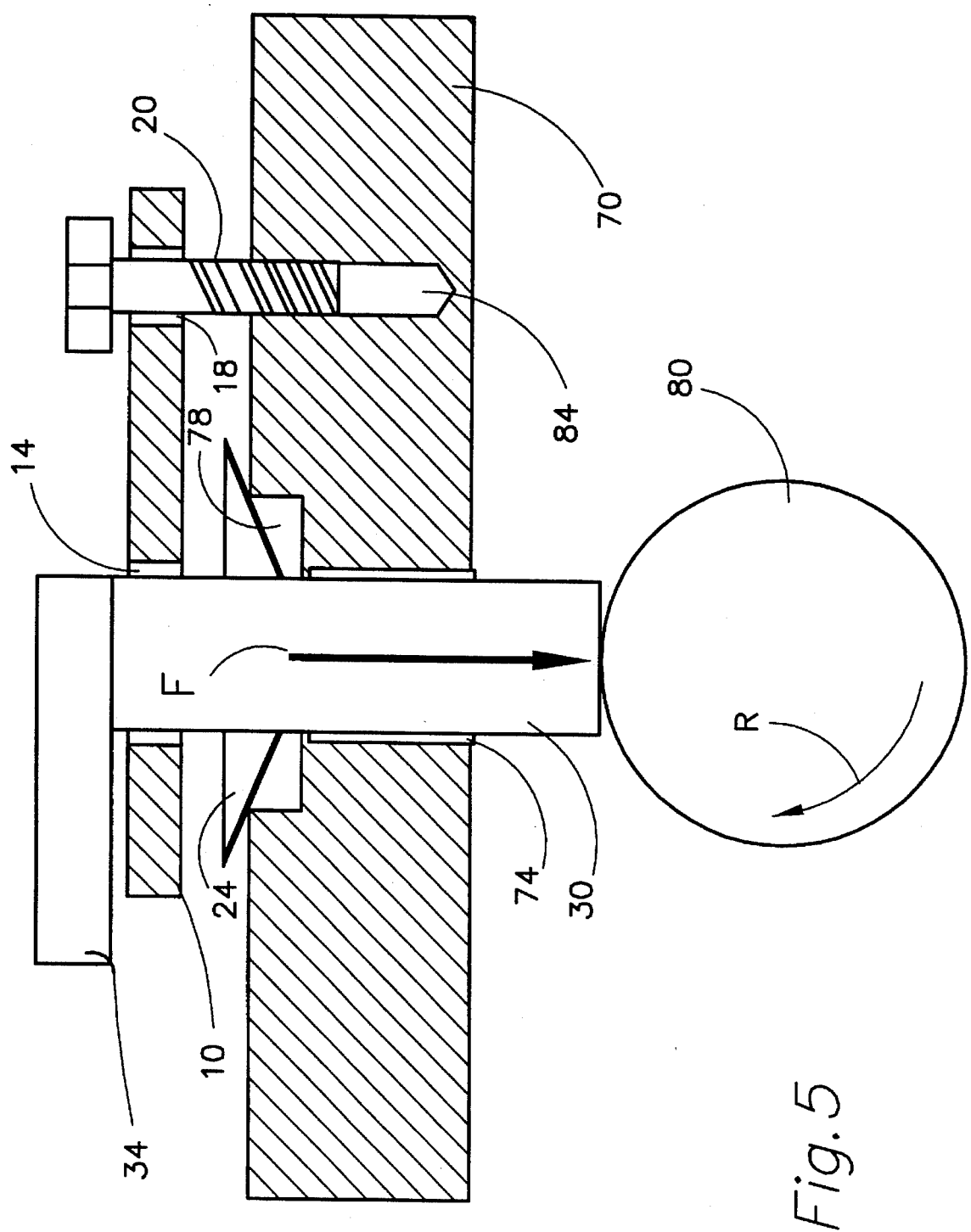
FIG. 5 shows the present invention associated with a gear tooth sensor prior to clamping a clamping bar against an object to deform the deformable washer shown in FIG. 3.

Throughout the Description of the Preferred Embodiment, like components will be identified by like reference numerals.

FIG. 1 shows a clamping bar 10 which is provided with two openings. A first opening 14 is shaped to receive a tubular portion of a sensor in slideable association therein and a second opening 18 is shaped to receive the shank of a bolt in slideable relationship therein.

FIG. 2 shows a bolt 20 that is provided with a threaded shank and a hex-head. However, it should be realized that any means for a rigidly attaching the clamping bar 10 to an object is suitable for use with the present invention.

FIG. 3 is a deformable washer 24 that is generally conical in shape. An opening 28 is formed in the central portion of the washer. As illustrated in FIG. 3, the generally conical shape of the washer provides a thickness T in the vertical dimension. Although many different types of deformable washers can be used in association with the present invention, a Belleville washer is suitable for these purposes.

FIG. 4 illustrates a typical gear tooth sensor which has a tubular portion 30 and an attachment flange 34 in certain types of sensors. However, it should be realized that the attachment flange 34 is not necessary on all types of sensors. In fact, the gear tooth sensor described in the Stolfus patent does not utilize this component. Inside the tubular portion 30, a permanent magnet 38 and a magnetically sensitive component 40 are associated together so that the magnetic field provided by the permanent magnet 38 impinges on the magnetically sensitive component 40. Therefore, distortions of the magnetic field caused by ferromagnetic objects passing through a predefined detection zone can be sensed by the magnetically sensitive component 40. The magnetically sensitive component can be a Hall effect element or a permalloy bridge arrangement. The particular type of magnetically sensitive component used in the gear tooth sensor is not limiting to the operation of the present invention. Conductive wires 44 and 46 can extend from a rear portion of the gear tooth sensor so that a connector 50 can be used for connecting the gear tooth sensor to other electrical components of the automobile system or other system where the sensor is used. The tubular portion 30 has a distal end 60 at which the magnetically sensitive component 40 is disposed.

FIG. 5 shows the assembly of a gear tooth sensor in association with an object 70. Although a simplified schematic illustration of the object 70 is shown in the Figures, it should be understood that, in a typical application of the present invention, the object 70 is a portion of the engine block of an automobile. An opening 74 is formed in the object 70 and an associated opening 76, such as a counterbore, is provided in an external surface of the object 70. The clamping bar 10 is disposed around the tubular portion 30 of the sensor. The opening 14 in the clamping bar 10 is sized to permit easy passage of the tubular portion 30 therethrough. The deformable washer 24 is also disposed over the tubular portion 30. The opening 28 in the central portion of the deformable washer 24 is sized to permit the tubular portion 30 to pass through it, but not with excessive clearance therebetween. In other words, the deformable washer 24 can slide along the tubular portion 30, but the clearance between the opening 28 and the outer surface of the tubular portion 30 is maintained at a minimal dimension for reasons that will be described in greater detail below. After assembly of the clamping bar 10 and the deformable washer 24 to the tubular portion 30, the tubular portion 30 is inserted into the opening 74 of object 70 until its distal end 60 moves into contact with a rotatable target 80 as shown. The rotatable target 80 can be a gear having a plurality of gear teeth formed in its outer surface. However, for purposes of simplicity and clarity, the rotatable target 80 in FIG. 5 is illustrated as a simple circular shape. In an actual application with an automobile engine, the rotatable target 80 would have one or more teeth formed in its outer surface and would be disposed to rotate about an axis, as represented by arrow R. The bolt 20 is passed through a clearance opening 18 in the clamping bar 10 and disposed into threaded association with a hole 84 that is formed in the object 70.

FIG. 5 shows the arrangement of the present invention prior to tightening the bolt 20 down into the threaded hole 84 of the object 70. In the configuration represented in FIG. 5, the tubular portion 30 of the sensor can be manually pulled back away from the target 80 or reinserted to verify that the distal end 60 is in firm contact with the target 80.

Figure 6:
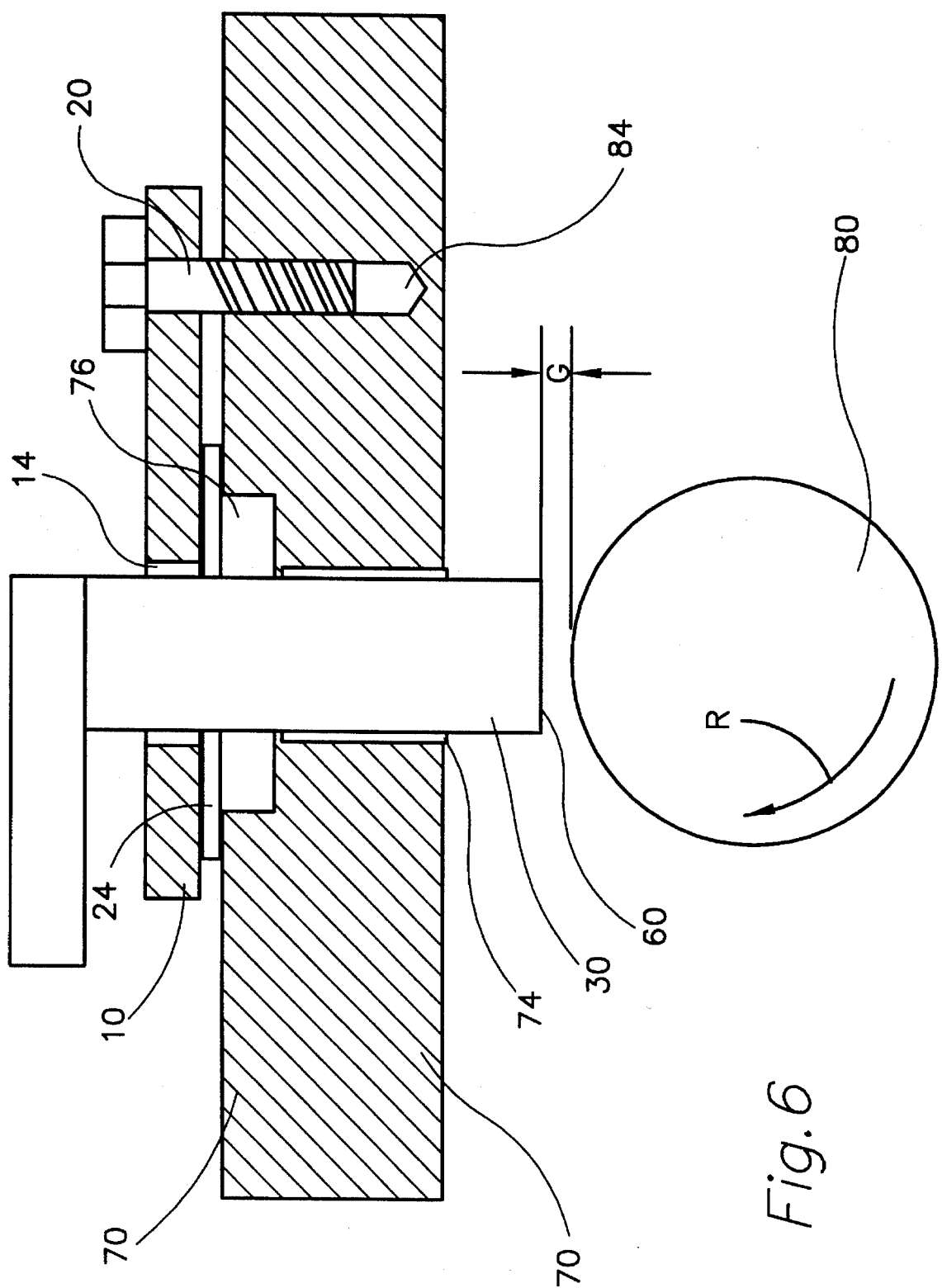
FIG. 6 shows the arrangement of FIG. 5 after the clamping bar is rigidly compressed against the object.

FIG. 6 shows the arrangement of FIG. 5 after the bolt 20 is tightened into the threaded hole 84 in object 70. As can be seen by comparing FIGS. 5 and 6, FIG. 6 shows the clamping bar 10 pressed downward toward the object 70 by the natural operation of the bolt 20. When the clamping bar 10 is pushed down toward the object 70, the deformable washer 24 is deformed into a generally flat shape as shown in FIG. 6. The inner edge of the opening 28, which extends through the deformable washer 24 as illustrated in FIG. 3, is pressed into the outer surface of the tubular portion 30 and rigidly attaches the deformable washer to the tubular portion 30. As the washer attaches to the tubular portion 30 in this way, it is being deformed through a combination of its contact with the circular edge of the counterbore 76 and the lower surface of the clamping bar 10. This causes the deformation of the washer 24 to raise the edge of its opening 28 away from the target 80. Because of the attachment of this inner edge to the tubular portion 30, the distal end 60 of the tubular portion 30 of the sensor is also raised away from the target 80. When the deformable washer 24 is completely deformed into a flat shape, the distal end 60 is moved from its initial contact with the target 80 to a second position that defines a gap G between the distal end 60 and the target 80. If the dimensions of the deformable washer 24 are properly selected in conjunction with the size of the counterbore 76 and the outer surface of the tubular portion 30, gap G can be accurately predetermined.

Figure 7:
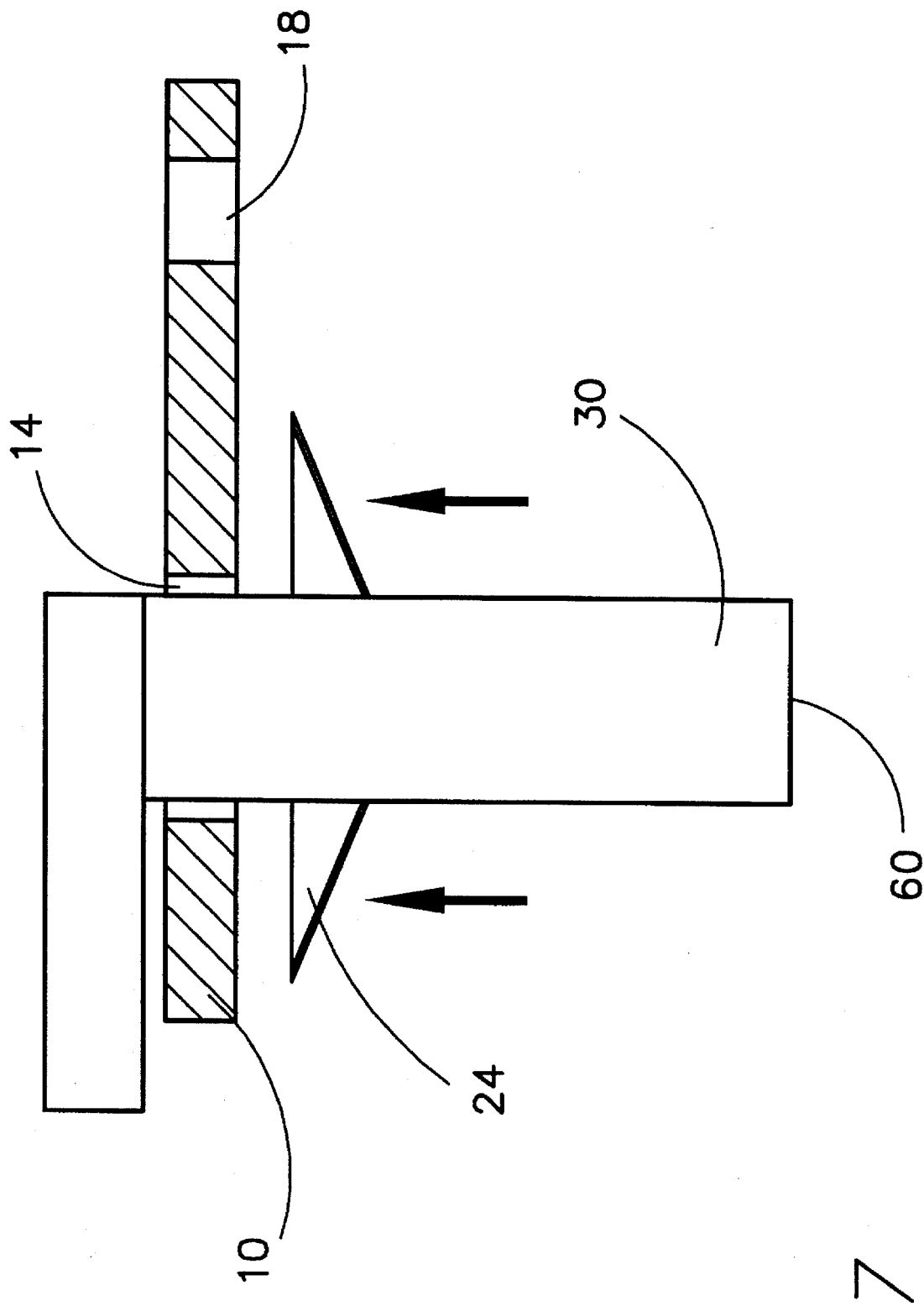
FIG. 7 is an illustration of a sensor, the clamping bar and the deformable washer associated together prior to insertion an opening of an object such as an automobile engine.
Figure 8:
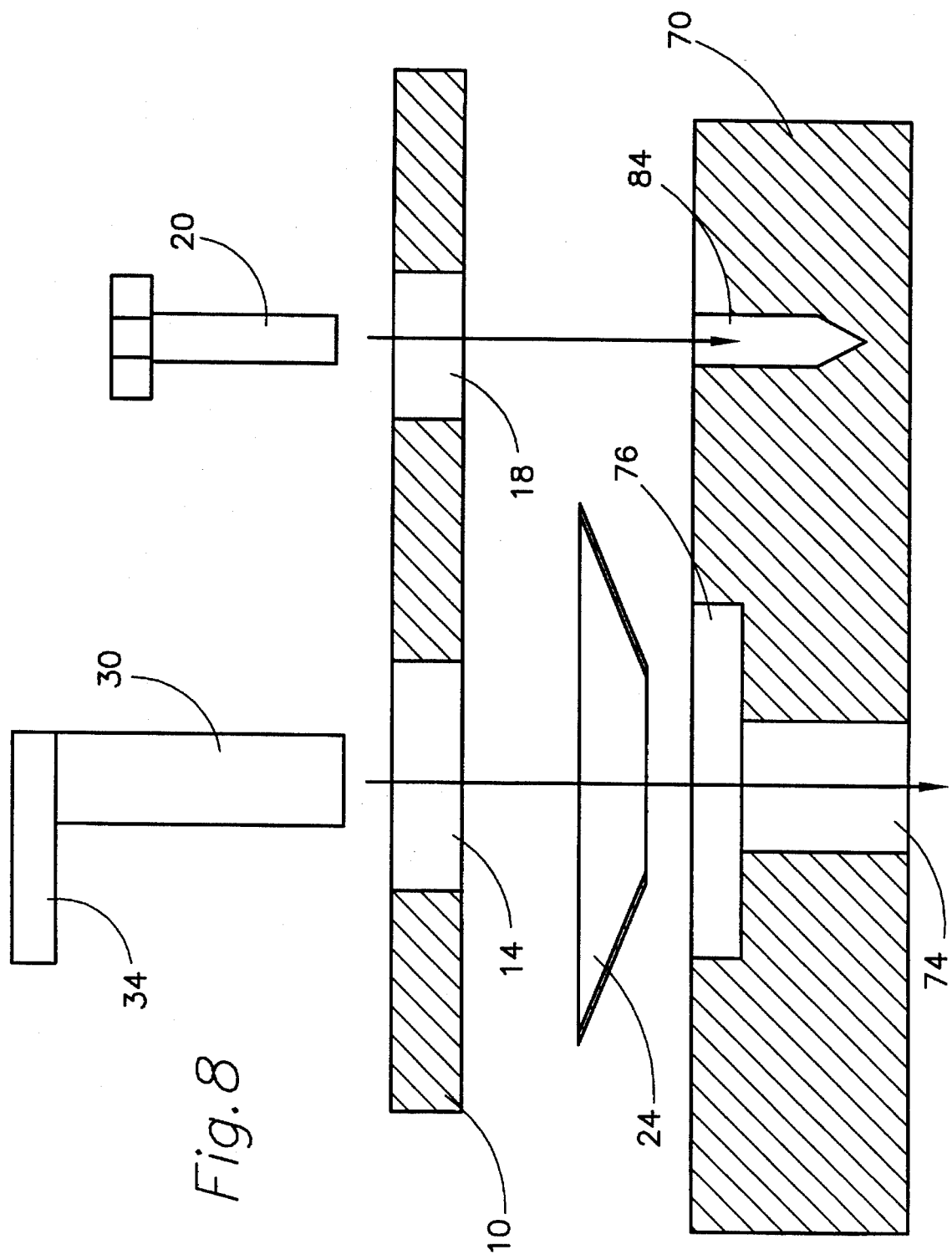
FIG. 8 is an exploded view illustrating the relative positions of the sensor, the clamping bar, the deformable washer and the external object to which the sensor is to be attached.

FIG. 7 illustrates the sensor in conjunction with the clamping bar 10 and the deformable washer 24 prior to insertion of the tubular portion 30 into the opening 74 of the object, as described above in conjunction with FIGS. 5 and 6. During the process of the present invention, the tubular portion 30 is inserted through opening 14 of the clamping bar. The opening 14 of the clamping bar is sized to permit easy passage of the tubular portion 30 therethrough. After passing the tubular portion 30 through opening 14, the tubular portion 30 is passed through the central opening 28 of the deformable washer 24. The opening 28 should be sized to permit the tubular portion 30 to slide into it. However, it is also beneficial to maintain intimate contact between the portion 30 and the washer 24. In addition, it should be understood that the opening extending through the deformable washer 24 need not be circular in shape. In some embodiments of the present invention, the inner edge of the opening 28 can have a plurality of teeth to facilitate passage of the washer over the tubular portion while also assisting in the rigid attachment of those teeth to the outer surface of the tubular portion when the washer is deformed. In addition, it should be realized that although only one bolt clearance hole 18 is shown in the clamping bar 10, two or more such clearance holes can be used in conjunction with the present invention. When the clamping bar 10 and the deformable washer 24 are associated with the tubular portion 30 as shown in FIG. 7, the assembly is ready for insertion into the hole 74 formed in the object 70. FIG. 8 is an exploded view which illustrates the relative positions of the object 70, the deformable washer 24, the clamping bar 10, the sensor with its tubular portion 30 and the bolt 20.

With reference to FIGS. 5, 6 and 8, it can be seen that the downward pressure provided by the clamping bar 10 compresses the thickness T of the deformable washer 24 between it and the object 70. This compression deforms the deformable washer into a generally flat shape and also raises the distal end 60 of the tubular portion 30 of the sensor away from the target. The magnitude of this position change, as the deformable washer 24 is compressed by the clamping bar 10, is represented by gap G. The object 70 can be geometrically determined to result in an accurately set gap between the distal end 60 of the tubular portion 30 and the target 80.

Figure 9:
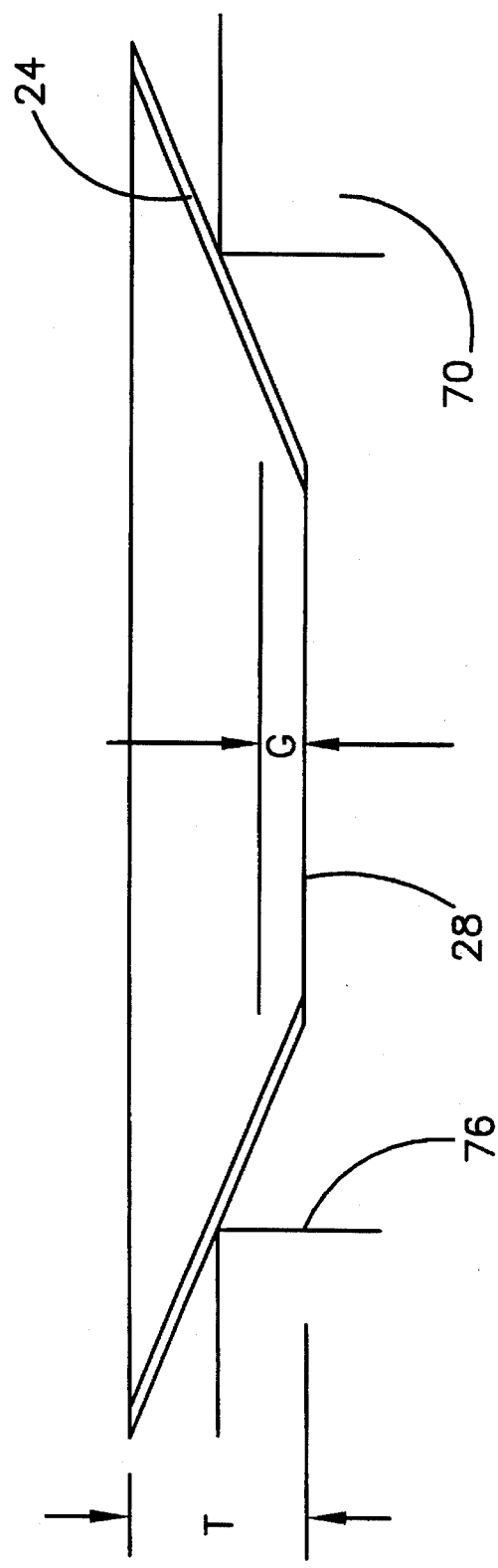
FIG. 9 illustrates the deformable washer of the present invention in contact with the edge of the counterbore prior to deformation.
Figure 10:
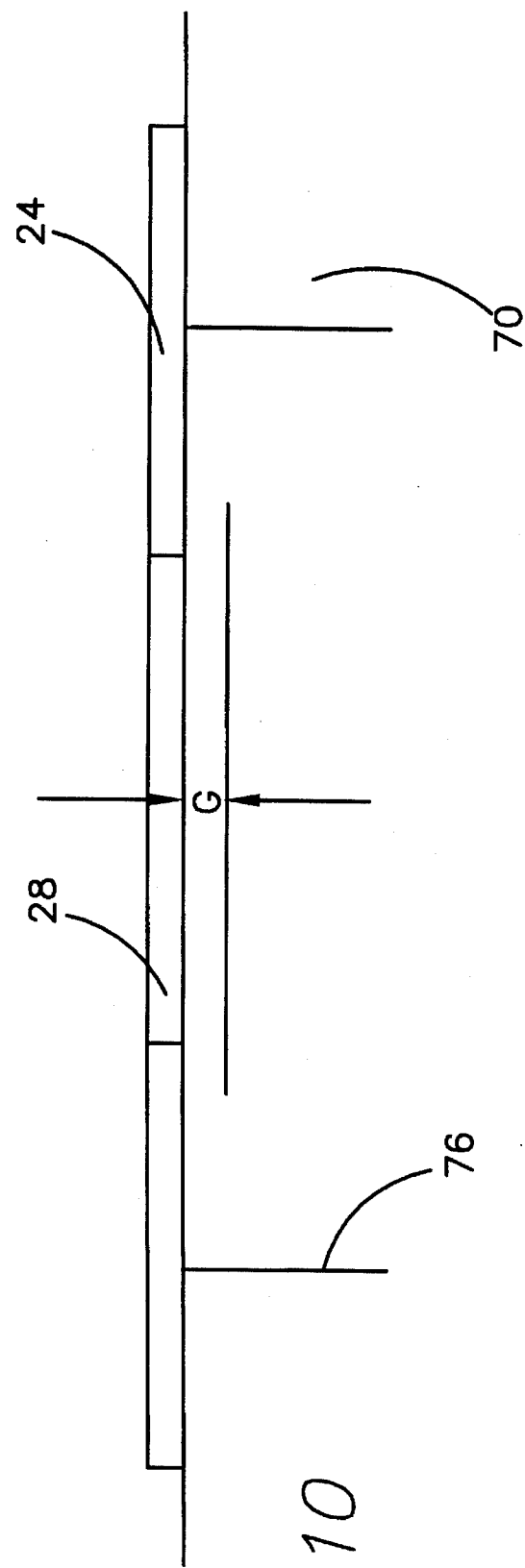
FIG. 10 shows the relationship between the deformable washer and the counterbore of the object following deformation.

FIGS. 9 and 10 illustrate the way in which the deformation of the deformable washer 24 achieves the positioning of the distal end 60 at a position which results in the accurate setting of gap G between the distal end 60 and the target 80. With reference to FIG. 9, it can be seen that the deformable washer 24 is disposed in contact with the edges of the counterbore 76 which is formed in the object 70. The position shown in FIG. 9 represents the status of the deformable object, as illustrated in FIG. 5, prior to its compression by the clamping bar 10. In FIG. 9, it can be seen that the thickness T of the deformable washer 24 is selected to result in a distance G between the upper surface of the object 70 at the counterbore 76 and the bottom surface of the deformable washer 24 where the opening 28 is formed. The geometry shown in FIG. 9 results in a movement of the distal end 60 of the tubular portion 30 by a distance G.

FIG. 10 shows the deformable washer 24 after it has been flattened by the compression of clamping bar 10 toward the object 70 by bolt 20. The flattening of the deformable washer 24 causes the bottom edge of the deformable member 24 at opening 28 to move upward into alignment with the upper surface of the object 70. This results in an upward movement that is generally equivalent to distance G. If the inner edge of opening 28 is in rigid contact with the outer surface of the tubular portion 30, this rigid attachment will also cause the tubular portion 30 to move upward by the same dimension G. The upward movement of the tubular portion 30 by distance G creates a gap G between the distal end 60 and the target 80 as illustrated in FIG. 6. The critical dimensions necessary to achieve the functions described above include the thickness T of the deformable washer 24, the dimension G shown in FIG. 9 between the bottom surface of the deformable member 24 and the upper surface of object 70 when the washer is in contact with the edges of the counterbore 76 prior to deformation. In addition, the clearance between the edge of opening 28 and the outer surface of the tubular portion 30 shown be minimal to result in virtually instantaneous attachment between the edge of opening 28 and the outer surface of the tubular portion 30 when the deformation of the deformable washer 24 begins as a result of the clamping force exerted against it by the clamping bar 10.

The present invention provides an inexpensive, but accurate, way of setting the position of a sensor with respect to its target without the need of expensive and complicated measurement and attachment techniques. Although the present invention has been specifically illustrated to show one particularly preferred embodiment, it should be understood that many other embodiments are within its scope.

The embodiments of the invention in which an exclusive property or right is claimed are defined as follows:

1. A sensor arrangement, comprising:

a sensor having a generally tubular portion;

a deformable washer, said tubular portion being slideably disposed within a first opening of said deformable washer, said deformable washer being a conically shaped washer;

a clamping bar, said clamping bar having a second opening therethrough, said second opening slideably receiving said tubular portion therein, and a third opening; and a bolt, said third opening receiving said bolt in slideable relation therein, said bolt being engaged in threaded association in a first hole in a surface of an object, said tubular portion being disposed within a second hole of said object, said second hole having a counterbore portion formed in said surface of said object, said deformable washer being partially disposed within said counterbore portion and partially extending above said surface, said deformable washer being deformable into a flattened configuration between said clamping bar and said surface of said object, said deformable washer being deformable into a flattened configuration into rigid attachment with said tubular portion when said bolt is tightened to compress said clamping bar against said object, said deformable washer being sized relative to said counterbore portion to cause said tubular portion to be axially moved from a first position to a second position as a result of said washer being deformed between said clamping bar and said surface of said object and into rigid attachment with said tubular portion.

2. The apparatus of claim 1, wherein:

said sensor is a magnetically sensitive device.

3. The apparatus of claim 1, wherein:

said object is an automobile engine.

4. The apparatus of claim 1, wherein: said conically shaped washer is a Belleville washer.

5. The apparatus of claim 1, wherein:

said tubular portion has a generally circular cross section.

6. The apparatus of claim 1, wherein:

said tubular portion has a noncircular cross section.

7. The apparatus of claim 1, wherein:

said tubular portion is in contact with a rotatable object to be sensed when in said first position and spaced apart from said rotatable object to be sensed by a predetermined gap when in said second position, said predetermined gap being a function of the relative dimensions of said deformable washer and said counterbore portion.

8. A sensor arrangement, comprising:

a sensor having a generally tubular portion;

a deformable washer, said tubular portion being slideably disposed within a first opening of said deformable washer, said deformable washer being a conically shaped washer, said conically shaped washer being a Belleville washer;

a clamping bar, said clamping bar having a second opening therethrough, said second opening slideably receiving said tubular portion therein and a third opening; and a bolt, said third opening receiving said bolt in slideable relation therein, said bolt being engaged in threaded association in a first hole in a surface of an object, said tubular portion being disposed within a second hole of said object, said second hole having a counterbore portion formed in said surface of said object, said deformable washer being partially disposed within said counterbore portion and partially extending above said surface, said deformable washer being deformable into a flattened configuration between said clamping bar and said surface of said object, said deformable washer being deformable into a flattened configuration into rigid attachment with said tubular portion when said bolt is tightened to compress said clamping bar against said object, said deformable washer being sized relative to said counterbore portion to cause said tubular portion to be axially moved from a first position to a second position as a result of said washer being deformed between said clamping bar and said surface of said object and into rigid attachment with said tubular portion.

9. The apparatus of claim 8, wherein:

said sensor is a magnetically sensitive device.

10. The apparatus of claim 8, wherein:

said object is an automobile engine.

11. The apparatus of claim 8, wherein:

said tubular portion has a generally circular cross section.

12. The apparatus of claim 8, wherein:

said tubular portion has a noncircular cross section.

13. The apparatus of claim 8, wherein:

said tubular portion is in contact with a rotatable object to be sensed when in said first position and spaced apart from said rotatable object to be sensed by a predetermined gap when in said second position, said predetermined gap being a function of the relative dimensions of said deformable washer and said counterbore portion.

* * * * *